United States Patent
Kim et al.

(10) Patent No.: US 11,543,760 B2
(45) Date of Patent: Jan. 3, 2023

(54) CONTROLLING IMAGE FORMING APPARATUS EQUIPPED WITH NON-GENUINE TONER CARTRIDGE

(71) Applicant: Hewlett-Packard Development Company, L.P., Spring, TX (US)

(72) Inventors: JungHun Kim, Seongnam-si (KR); Sangmi Kim, Seongnam-si (KR); Minyoung Son, Seongnam-si (KR); JinKyu Kook, Seongnam-si (KR); Sejong Kim, Seongnam-si (KR); Min Namgoong, Seongnam-si (KR); Hyein Lee, Seongnam-si (KR); HyunWoo Yoo, Seongnam-si (KR); ByeongJu Hwang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/413,211

(22) PCT Filed: Feb. 2, 2020

(86) PCT No.: PCT/US2020/018971
§ 371 (c)(1),
(2) Date: Jun. 11, 2021

(87) PCT Pub. No.: WO2021/055002
PCT Pub. Date: Mar. 25, 2021

(65) Prior Publication Data
US 2022/0019156 A1 Jan. 20, 2022

(30) Foreign Application Priority Data
Sep. 20, 2019 (KR) .................. 10-2019-0116411

(51) Int. Cl.
*G06F 3/12* (2006.01)
*G03G 15/08* (2006.01)
(Continued)

(52) U.S. Cl.
CPC ..... *G03G 15/0863* (2013.01); *G03G 15/5016* (2013.01); *H04N 1/0097* (2013.01); *H04N 1/00938* (2013.01)

(58) Field of Classification Search
None
See application file for complete search history.

(56) References Cited

U.S. PATENT DOCUMENTS

| 6,625,402 B2 | 9/2003 | Takemoto |
| 7,206,524 B2 | 4/2007 | Yokoe |

(Continued)

FOREIGN PATENT DOCUMENTS

| EP | 2863620 A1 * | 4/2015 | ......... G03G 15/0863 |
| JP | 2013-104948 A | 5/2013 | |
| KR | 10-0498053 B1 | 7/2005 | |

*Primary Examiner* — Dung D Tran
(74) *Attorney, Agent, or Firm* — Brooks, Cameron & Huebsch, PLLC

(57) ABSTRACT

An example image forming apparatus may include a memory storing computer executable instructions and a processor. The processor may, by executing the computer executable instructions stored in the memory, determine whether a toner cartridge mounted in the image forming apparatus is genuine, and when it is determined that the toner cartridge is non-genuine, deactivate a user-defined application installed in the image forming apparatus.

18 Claims, 17 Drawing Sheets

(51) Int. Cl.
G03G 15/00 (2006.01)
H04N 1/00 (2006.01)

(56) References Cited

U.S. PATENT DOCUMENTS

| | | | |
|---|---|---|---|
| 8,494,379 B2 | 7/2013 | Kim | |
| 9,791,823 B2 | 10/2017 | Richards et al. | |
| 10,120,333 B2 | 11/2018 | Shinagawa | |
| 10,372,061 B1* | 8/2019 | Fuse | G03G 15/0863 |
| 10,899,151 B1* | 1/2021 | Asahi | B41J 2/17533 |
| 2002/0131784 A1* | 9/2002 | Takemoto | G03G 15/5075 |
| | | | 399/12 |
| 2003/0031475 A1* | 2/2003 | Asakura | G03G 21/1892 |
| | | | 399/27 |
| 2010/0177351 A1* | 7/2010 | Asai | H04N 1/00344 |
| | | | 358/1.15 |
| 2010/0290791 A1* | 11/2010 | Sonoda | G03G 15/0863 |
| | | | 399/12 |
| 2013/0088740 A1* | 4/2013 | Nishimura | G03G 21/043 |
| | | | 358/1.14 |
| 2013/0089343 A1* | 4/2013 | Nishimura | G03G 15/502 |
| | | | 399/12 |
| 2014/0233967 A1* | 8/2014 | Suzuki | G06F 3/1208 |
| | | | 399/81 |
| 2017/0163641 A1 | 6/2017 | Adkins et al. | |
| 2020/0233359 A1* | 7/2020 | Nishimura | G03G 21/1892 |

* cited by examiner

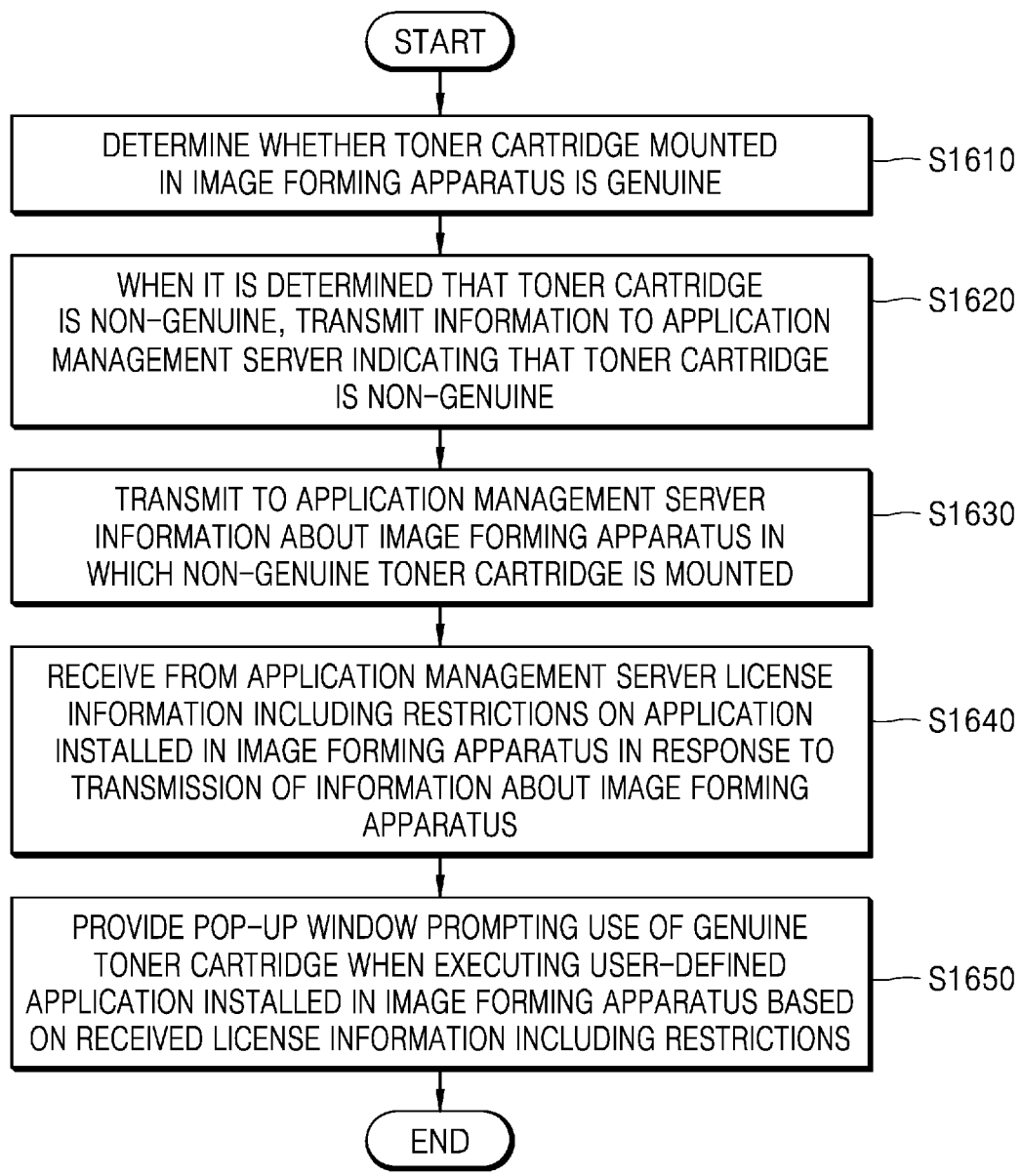

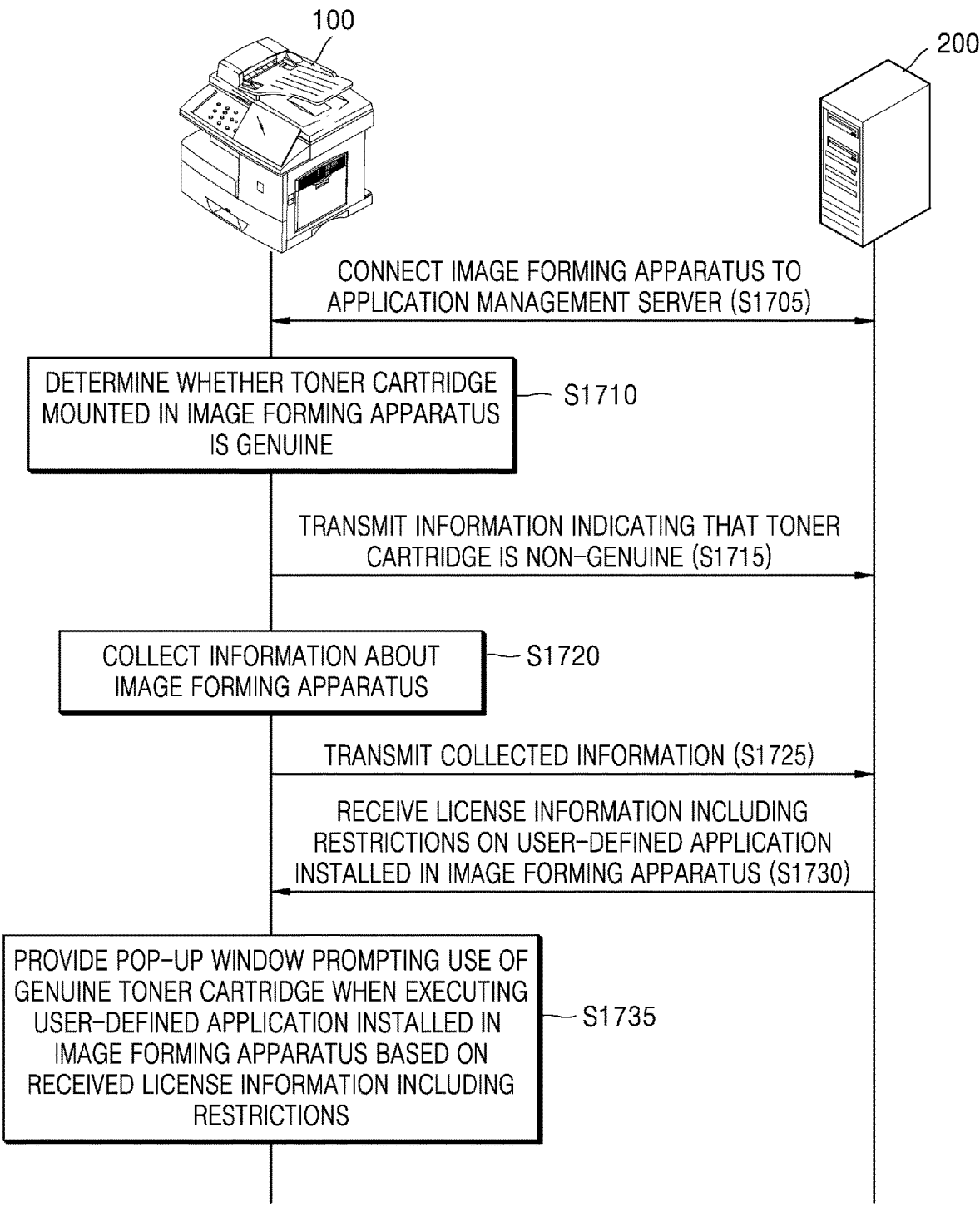

CONTROLLING IMAGE FORMING APPARATUS EQUIPPED WITH NON-GENUINE TONER CARTRIDGE

BACKGROUND

An image forming apparatus such as a multifunctional printer may support basic functions such as printing, scanning, copying, and faxing functions, and a user may use a corresponding function by executing a system-provided application corresponding to each basic function in the image forming apparatus. In order to expand types of functions supported by an image forming apparatus, a user may additionally install a user-defined application provided by a third party or a vendor of the image forming apparatus in the image forming apparatus.

BRIEF DESCRIPTION OF DRAWINGS

Various examples will be described below by referring to the following figures.

FIG. 16 is a flowchart illustrating a process in which, when a non-genuine toner cartridge is mounted in an image forming apparatus, the image forming apparatus provides a pop-up window prompting use of a genuine toner cartridge when executing a user-defined application installed in the image forming apparatus according to an example; and FIG. 17 illustrates an example in which, when a non-genuine toner cartridge is mounted in an image forming apparatus, the image forming apparatus provides a pop-up window prompting use of a genuine toner cartridge when executing a user-defined application installed in the image forming apparatus, based on license information including restrictions received from an application management server.

DETAILED DESCRIPTION OF EXAMPLES

Figure 1:
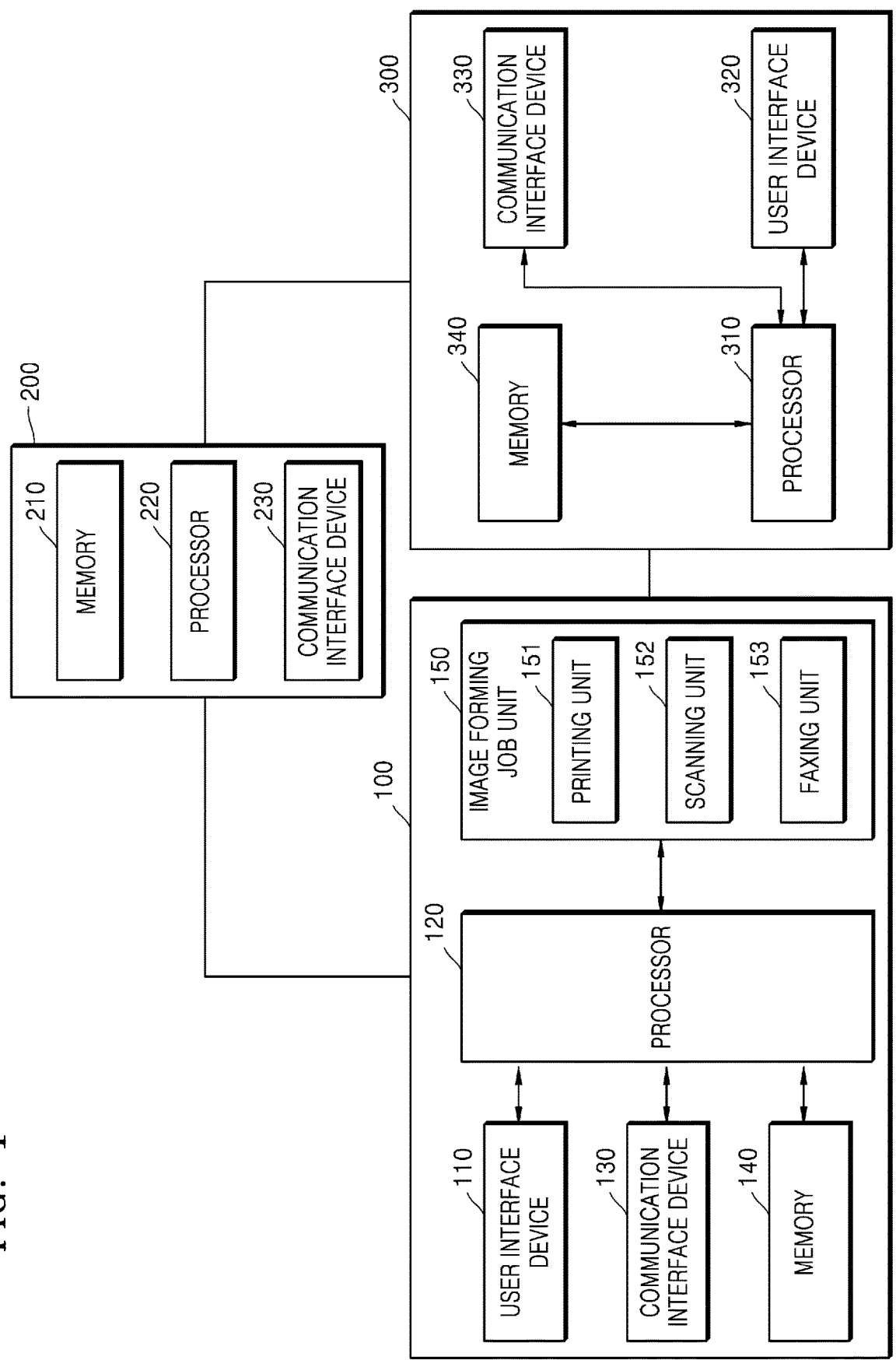
FIG. 1 is a view for explaining a configuration and operation of each of an image forming apparatus, an application management server, and a user terminal according to an example.

Hereinafter, various examples will be described with reference to the drawings. Like reference numerals in the specification and the drawings denote like elements, and thus a repetitive description may be omitted.

FIG. 1 is a view for explaining a configuration and operation of each of an image forming apparatus, an application management server, and a user terminal according to an example.

Referring to FIG. 1, an image forming apparatus 100 may include a user interface device 110, a processor 120, a communication interface device 130, a memory 140, and an image forming job unit 150. In addition, although not shown, the image forming apparatus 100 may further include a power supply unit for supplying power to the respective components.

The user interface device 110 may include an input unit for receiving an input for performing an image forming job from a user, and an output unit for displaying information such as a result of performing the image forming job or a state of the image forming apparatus 100.

The processor 120 may control an operation of the image forming apparatus 100 and may include at least one processor such as a central processing unit (CPU). The processor 120 may control other components included in the image forming apparatus 100 to perform an operation corresponding to the user input received through the user interface device 110. The processor 120 may include at least one specialized processor corresponding to a predetermined function. The processor 120 may execute a program stored in the memory 140, read data or files stored in the memory 140, or store a new program or application in the memory 140.

The communication interface device 130 may perform wired or wireless communication with another device or a network. To this end, the communication interface device 130 may include a communication module (e.g., transceiver) supporting at least one of various wired or wireless communication methods. The communication interface device 130 may be connected to an external apparatus located outside the image forming apparatus 100 to transmit and receive signals or data. Referring to FIG. 1, the image forming apparatus 100 may be connected to an application management server 200 or a user terminal 300 through the communication interface device 130. The user terminal 300 may include, for example, a smart phone, a tablet, a personal computer (PC), a camera, a wearable device, etc.

The memory 140 may store various types of data such as applications, programs, files, etc. The processor 120 may access and use the data stored in the memory 140 or store new data in the memory 140. In addition, the processor 120 may install and execute a program stored in the memory 140 in the image forming apparatus 100. In addition, the processor 120 may install a program or an application received from the outside through the communication interface device 130 in the image forming apparatus 100.

Functions that may be executed by the image forming apparatus 100 include a 'system provided application' installed in the image forming apparatus 100 and a 'user defined application' developed by a third party or a vendor of the image forming apparatus 100 and installed later in the image forming apparatus 100. The user defined application may be received from the application management server 200 through the communication interface device 130 and installed in the image forming apparatus 100.

The image forming job unit 150 may perform an image forming job such as printing, scanning, copying, or faxing. A printing unit 151 may form an image on a recording medium by various printing methods such as an electrophotographic method, an inkjet method, a thermal transfer method, and a thermal method. A scanning unit 152 may irradiate light onto a document, receive reflected light, and read an image recorded on the document. In a faxing unit 153, a configuration for scanning an image may be shared with the scanning unit 152, and a configuration for printing a received file may be shared with the printing unit 151, and a scanned file may be transmitted to a destination or a file may be received from an external source.

The application management server 200 may include a memory 210, a processor 220, and a communication interface device 230. The memory 210 may store instructions executable by the processor 220. The processor 220 may control an operation of the application management server 200 and may include at least one processing unit. The communication interface device 230 may be provided with a communication module (e.g., transceiver) that may communicate with the communication interface device 130 of the image forming apparatus 100 or a communication interface device 330 of the user terminal 300.

The application management server 200 may provide a service of registering, downloading, or updating an application that may be installed in the image forming apparatus 100, thereby providing an environment in which users of the image forming apparatus 100 may additionally utilize the image forming apparatus 100.

The application management server 200 may be in the form of a distribution system including a first server (not shown) that serves as an interface for access from the outside and a second server (not shown) that registers and downloads the user defined application developed by the third party or the vendor.

The user terminal 300 may include a processor 310, a user interface device 320, a communication interface device 330, and a memory 340.

The processor 310 may control an operation of the user terminal 300 and may include at least one processing unit such as a CPU. The processor 310 may control other components included in the user terminal 300 to perform an operation corresponding to a user input received through the user interface device 320. The processor 310 may include at least one specialized processing unit corresponding to each function. The processor 310 may execute a program stored in the memory 340, read data or files stored in the memory 340, or store a new file in the memory 340.

The user interface device 320 may include an input unit for obtaining a user input and an output unit for providing information to the user.

The user terminal 300 may be connected to an external apparatus such as the image forming apparatus 100 or the application management server 200 through the communication interface device 330.

The memory 340 may store instructions executable by the processor 310. The memory 340 may install and store various types of data such as programs such as applications and files.

The names of components of the image forming apparatus 100, the application management server 200, and the user terminal 300 described above may vary, and each of the image forming apparatus 100, the application management server 200, and the user terminal 300 may include at least one of the aforementioned components, may not include some of the components or may further include additional components.

Through the communication connection between the image forming apparatus 100, the application management server 200, and the user terminal 300 described above, the image forming apparatus 100 may be managed using the state information or the consumable information of the image forming apparatus 100 or applications installed in the image forming apparatus 100 may be managed.

Hereinafter, when the image forming apparatus 100 uses a non-genuine consumable, for example, a non-genuine toner cartridge, example methods of prompting the image forming apparatus 100 to use a genuine consumable according to a method of restricting the use of the user defined application installed in the image forming apparatus 100, or restricting a predetermined service provided by the application management server 200 will be described.

Figure 2:
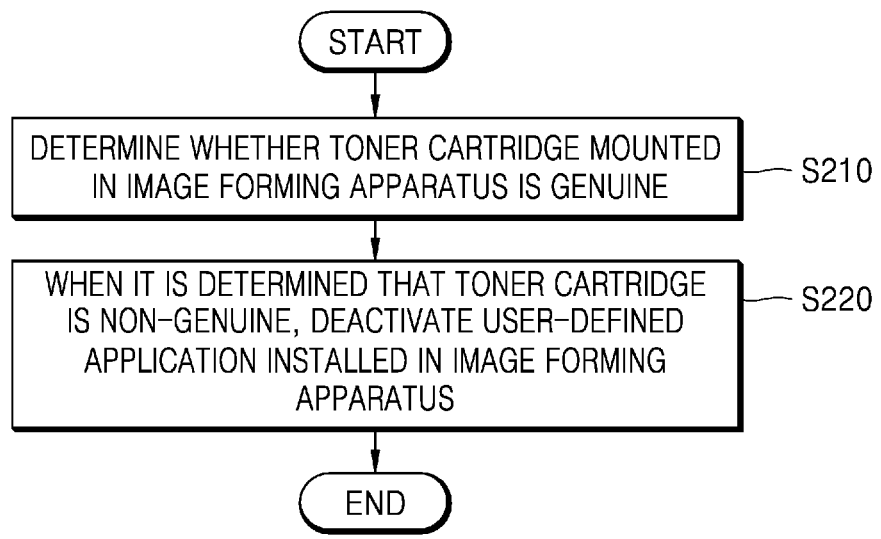
FIG. 2 is a flowchart illustrating a process in which an image forming apparatus deactivates a user-defined application installed in the image forming apparatus when a non-genuine toner cartridge is mounted in the image forming apparatus according to an example.

FIG. 2 is a flowchart illustrating a process in which an image forming apparatus deactivates a user defined application installed in the image forming apparatus when a non-genuine toner cartridge is mounted in the image forming apparatus according to an example.

Referring to FIG. 2, the image forming apparatus 100 may determine whether a toner cartridge mounted in the image forming apparatus 100 is genuine in operation S210. For example, when a predetermined condition is satisfied or predetermined information is confirmed, the image forming apparatus 100 may determine that the toner cartridge is non-genuine. In an example, whether the toner cartridge is genuine may be performed when the image forming apparatus 100 is rebooted or powered-on, when the toner cartridge is replaced, every set time, every predetermined period, or the like.

When it is determined that the toner cartridge is non-genuine, the image forming apparatus 100 may deactivate a user defined application installed in the image forming apparatus 100 in operation S220.

Figure 3:
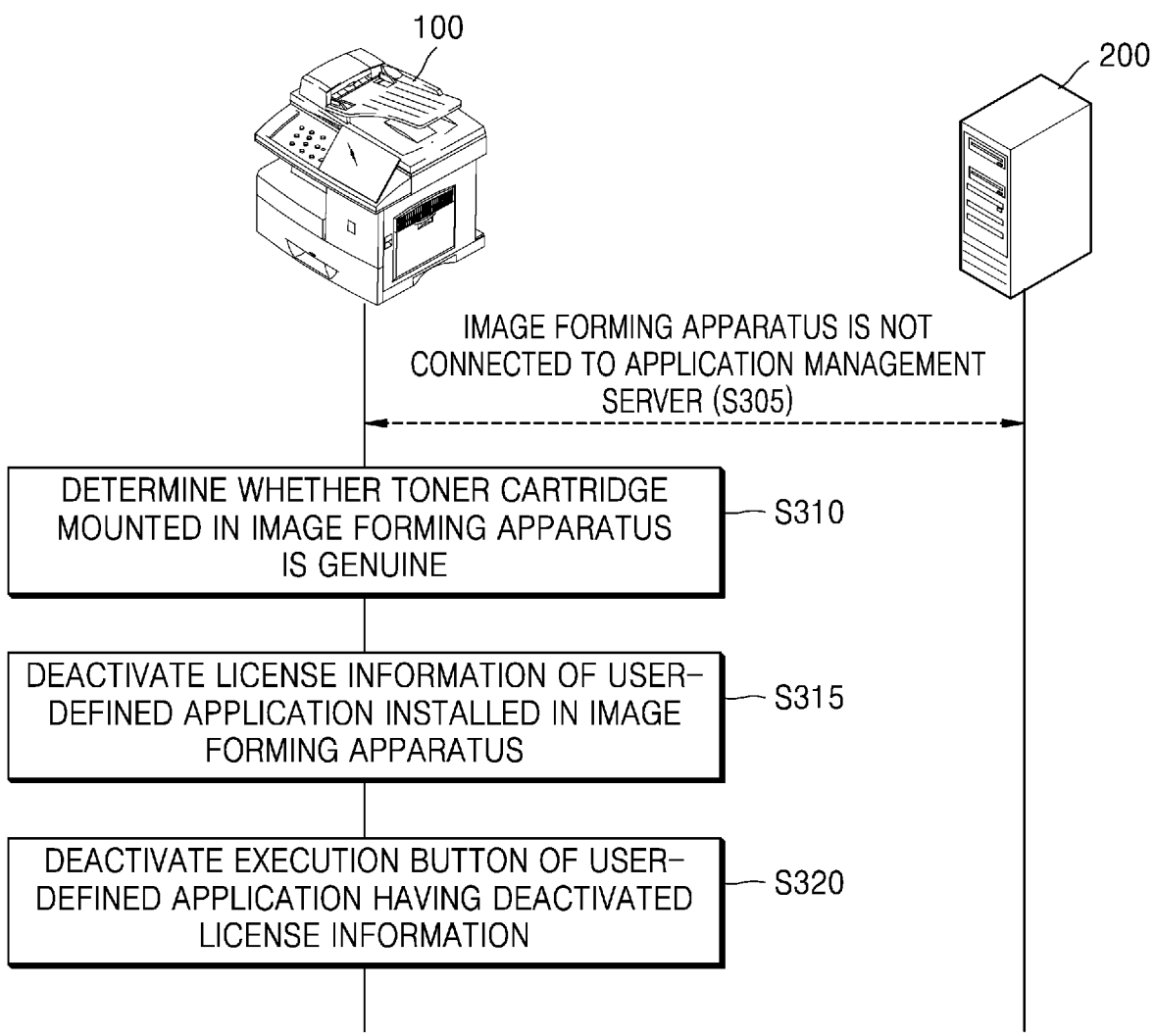
FIGS. 3, 4, and 5 illustrate various examples in which, when a non-genuine toner cartridge is mounted in an image forming apparatus, the image forming apparatus deactivates a user-defined application installed in the image forming apparatus.
Figure 4:
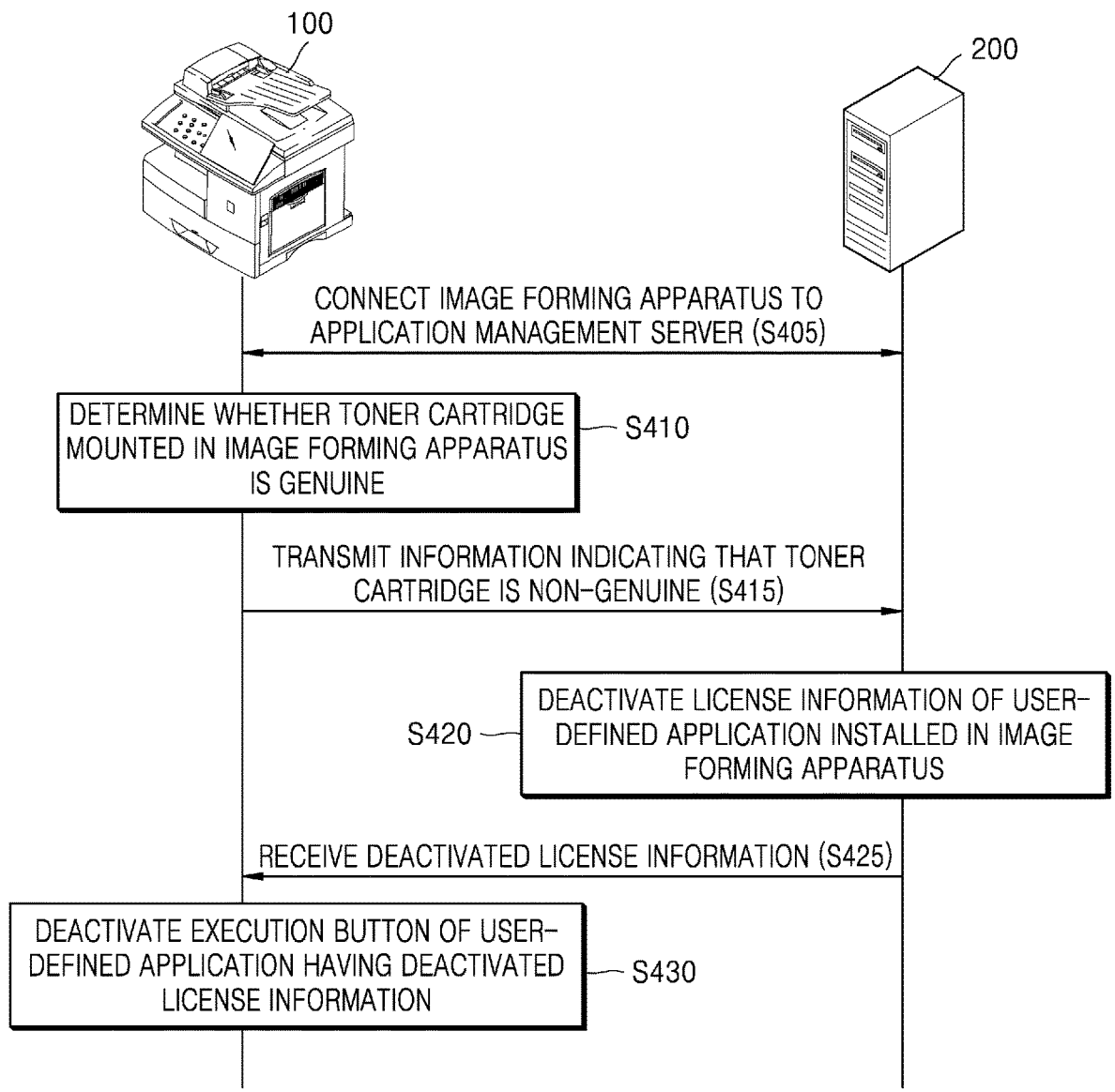
Figure 5:
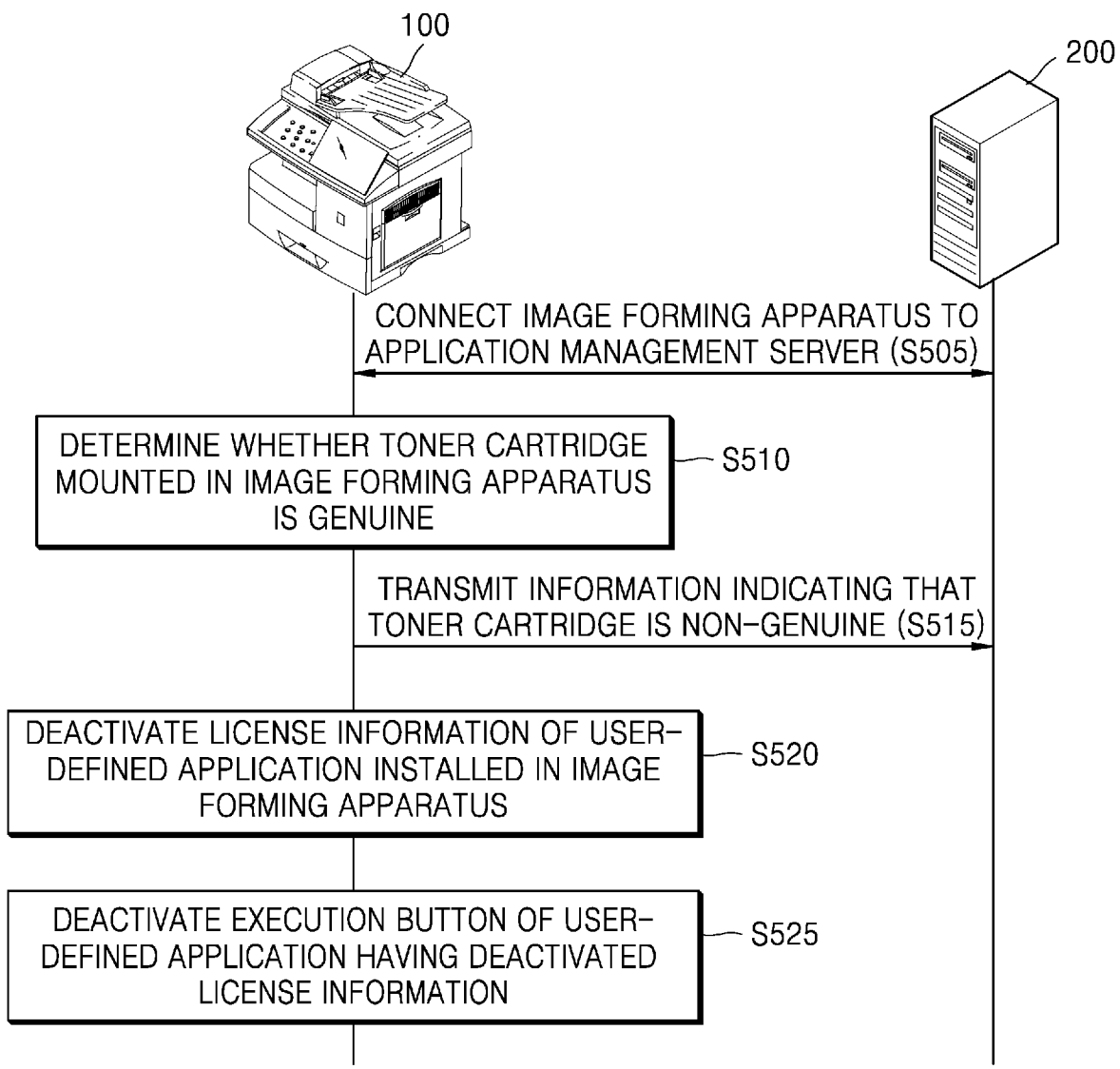

FIGS. 3, 4, and 5 illustrate various examples in which, when a non-genuine toner cartridge is mounted in an image forming apparatus, the image forming apparatus deactivates a user defined application installed in the image forming apparatus.

FIG. 3 illustrates an example in which an image forming apparatus determines whether a toner cartridge mounted in the image forming apparatus is genuine based on a connection state with an application management server and deactivates a user defined application installed in the image forming apparatus.

Referring to FIG. 3, the image forming apparatus 100 may be connected to the application management server 200, download a user defined application, and install the user defined application in the image forming apparatus 100. The image forming apparatus 100 may execute the installed user defined application to use functions of the image forming apparatus 100.

If the image forming apparatus 100 is not connected to the application management server 200 for a predetermined period of time or the image forming apparatus 100 is not used, the image forming apparatus 100 and the application management server 200 may be disconnected from each other and a predetermined period of time may elapse in a disconnection state in operation S305.

The image forming apparatus 100 may determine whether a toner cartridge mounted in the image forming apparatus 100 is genuine based on the connection state with the application management server 200 in operation S310. When the image forming apparatus 100 is not connected to the application management server 200 for the predetermined period of time, the image forming apparatus 100 may determine that the toner cartridge mounted in the image forming apparatus 100 is non-genuine.

When it is determined that the toner cartridge is non-genuine, the image forming apparatus 100 may deactivate license information of the user defined application installed in the image forming apparatus 100 in operation S315.

In an example, the image forming apparatus 100 may deactivate an execution button of the user defined application having the deactivated license information in operation S320. Because the execution button of the user defined application is deactivated, a user is unable to execute the user defined application.

FIG. 4 illustrates an example in which an image forming apparatus determines whether a toner cartridge mounted in the image forming apparatus is genuine based on information of the toner cartridge mounted in the image forming apparatus, receives the deactivated license information from an application management server, and deactivates a user defined application installed in the image forming apparatus.

Referring to FIG. 4, the image forming apparatus 100 may be connected to the application management server 200 in operation S405. For example, the image forming apparatus 100 may be connected to the application management server 200 in a process of downloading and installing a user defined application provided by the application management server 200 or executing the user defined application installed in the image forming apparatus 100.

The image forming apparatus 100 may determine whether a toner cartridge mounted in the image forming apparatus 100 is genuine based on the information of the toner cartridge mounted in the image forming apparatus 100 in operation S410. The information of the toner cartridge may be stored in the toner cartridge or in the image forming apparatus 100 in which the toner cartridge is mounted.

When it is determined that the toner cartridge is non-genuine, the image forming apparatus 100 may transmit information, to the application management server 200, that the toner cartridge is non-genuine in operation S415. The identification information of the image forming apparatus 100 may be transmitted to the application management server 200 together with the information that the toner cartridge is non-genuine.

The application management server 200 may deactivate the license information of the user defined application installed in the image forming apparatus 100 in which a non-genuine toner cartridge is mounted in operation S420.

The image forming apparatus 100 may receive the deactivated license information of the user defined application installed in the image forming apparatus 100 from the application management server 200 in response to transmission of the information that the toner cartridge is non-genuine to the application management server 200 in operation S425.

The image forming apparatus 100 may deactivate the execution button of the user defined application having the deactivated license information in operation S430.

FIG. 5 illustrates an example in which an image forming apparatus determines whether a toner cartridge mounted in the image forming apparatus is genuine based on information of the toner cartridge mounted in the image forming apparatus, and deactivates a user defined application installed in the image forming apparatus. Detailed descriptions that are the same as those provided in FIG. 4 will be omitted.

Referring to FIG. 5, the image forming apparatus 100 may be connected to the application management server 200 in operation S505.

The image forming apparatus 100 may determine whether a toner cartridge mounted in the image forming apparatus 100 is genuine, based on the information of the toner cartridge mounted in the image forming apparatus 100 in operation S510.

When it is determined that the toner cartridge is non-genuine, the image forming apparatus 100 may transmit information, to the application management server 200, that the toner cartridge is non-genuine in operation S515.

The image forming apparatus 100 may deactivate license information of a user defined application installed in the image forming apparatus 100 in operation S520.

The image forming apparatus 100 may deactivate an execution button of the user defined application having the deactivated license information in operation S525.

Figure 6:
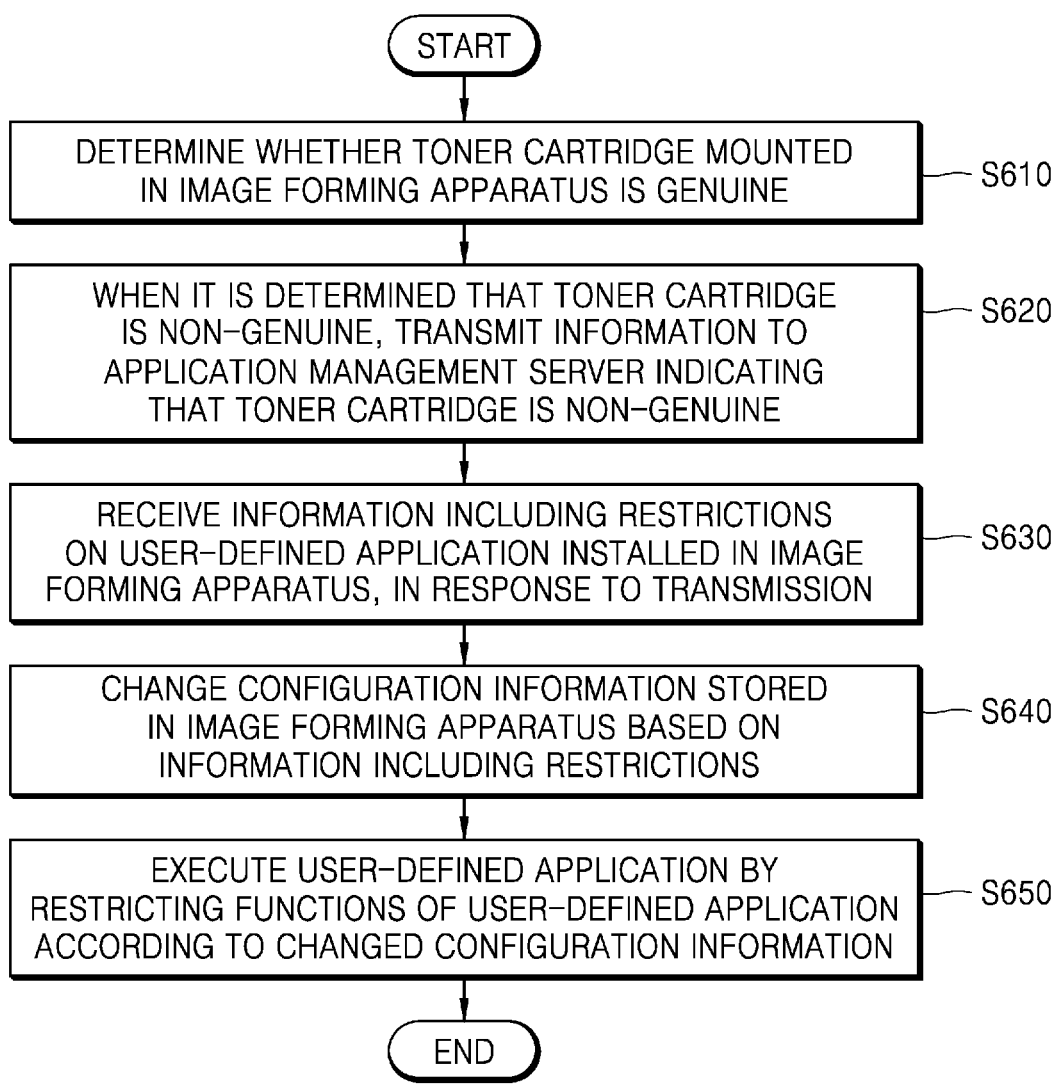
FIG. 6 is a flowchart illustrating a process in which, when a non-genuine toner cartridge is mounted in an image forming apparatus, the image forming apparatus executes a user-defined application installed in the image forming apparatus after restricting functions of the user-defined application according to an example.

FIG. 6 is a flowchart illustrating a process in which, when a non-genuine toner cartridge is mounted in an image forming apparatus, the image forming apparatus executes a user defined application installed in the image forming apparatus after restricting a function of the user defined application according to an example.

Referring to FIG. 6, the image forming apparatus 100 may determine whether a toner cartridge mounted in the image forming apparatus 100 is genuine in operation S610. For example, the image forming apparatus 100 may determine whether the toner cartridge is genuine or non-genuine based on information of the toner cartridge mounted in the image forming apparatus 100.

When it is determined that the toner cartridge is non-genuine, the image forming apparatus 100 may transmit information, to the application management server 200, that the toner cartridge is non-genuine in operation S620. The identification information of the image forming apparatus 100 may be transmitted to the application management server 200 together with the information that the toner cartridge is non-genuine.

The image forming apparatus 100 may receive, from the application management server 200, information including restrictions on a user defined application installed in the image forming apparatus 100 in response to transmission of the information that the toner cartridge is non-genuine in operation S630.

The image forming apparatus 100 may change configuration information stored in the image forming apparatus 100 based on the information including the restrictions received from the application management server 200 in operation S640.

The image forming apparatus 100 may execute the user defined application by restricting the function of the user defined application according to the changed configuration information in operation S650. Because some functions of the user defined application are restricted, all of the original functions thereof may not be executed.

Figure 7:
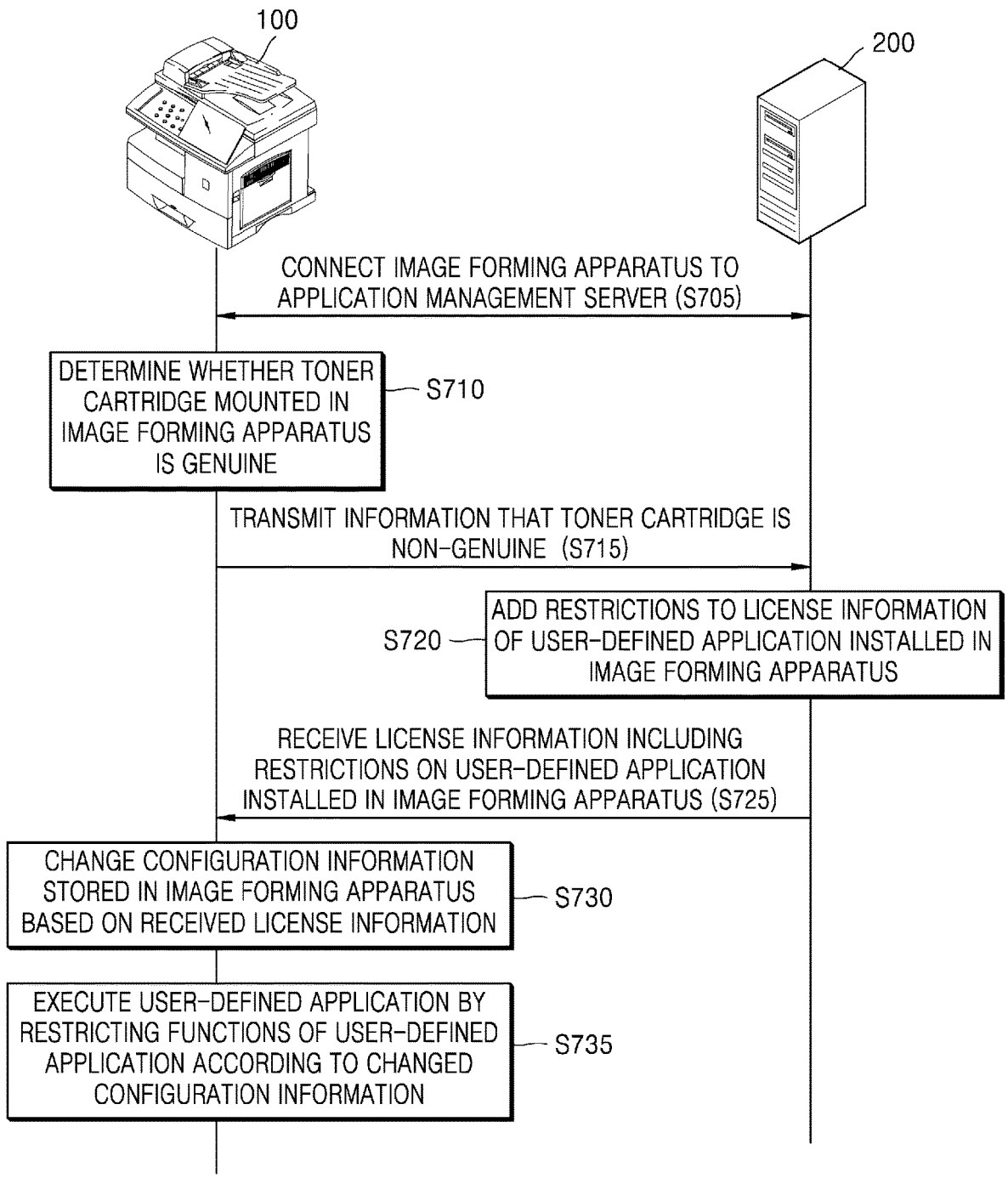
FIGS. 7 and 8 illustrate examples in which, when a non-genuine toner cartridge is mounted in an image forming apparatus, the image management apparatus receives, from an application management server, information including restrictions in order to restrict functions of a user-defined application installed in the image forming apparatus.
Figure 8:
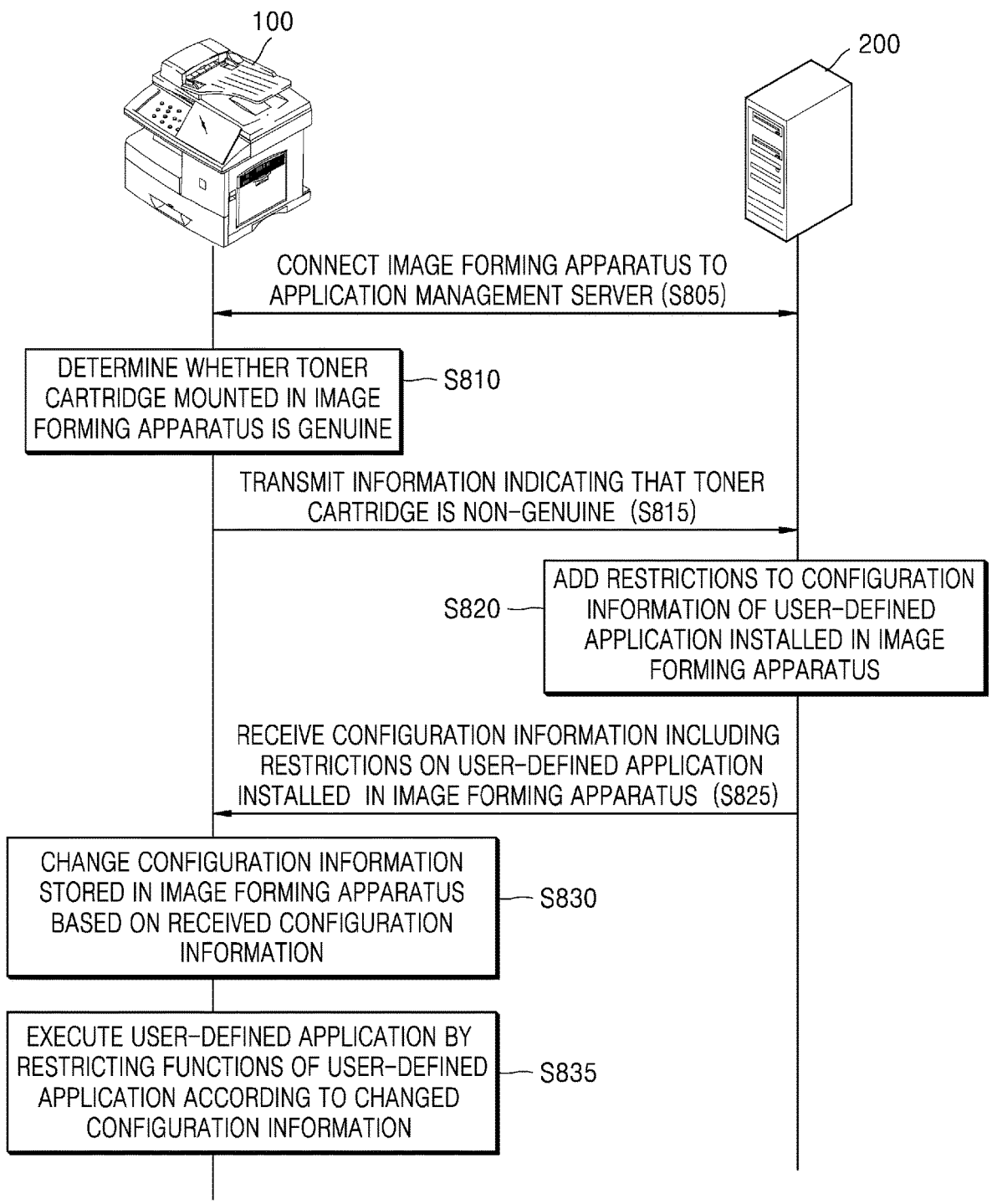

FIGS. 7 and 8 illustrate examples in which, when a non-genuine toner cartridge is mounted in an image forming apparatus, the image management apparatus receives, from an application management server, information including restrictions in order to restrict functions of a user defined application installed in the image forming apparatus.

FIG. 7 illustrates an example in which, when a non-genuine toner cartridge is mounted in an image forming apparatus, an image management apparatus receives, from an application management server, information including restrictions in order to restrict functions of a user defined application installed in the image forming apparatus.

Referring to FIG. 7, the image forming apparatus 100 may be connected to the application management server 200 in operation S705. For example, the image forming apparatus 100 may be connected to the application management server 200 in a process of downloading and installing a user defined application provided by the application management server 200 or executing the user defined application installed in the image forming apparatus 100.

The image forming apparatus 100 may determine whether a toner cartridge mounted in the image forming apparatus 100 is genuine based on information of the toner cartridge mounted in the image forming apparatus 100 in operation S710. The information of the toner cartridge may be stored in the toner cartridge or in the image forming apparatus 100 in which the toner cartridge is mounted.

When it is determined that the toner cartridge is non-genuine, the image forming apparatus 100 may transmit information, to the application management server 200, that the toner cartridge is non-genuine in operation S715. The identification information of the image forming apparatus 100 may be transmitted to the application management server 200 together with the information that the toner cartridge is non-genuine.

The application management server 200 may add restrictions to license information of the user defined application installed in the image forming apparatus 100 in which the non-genuine toner cartridge is mounted in operation S720.

The image forming apparatus 100 may receive the license information including the restrictions on the user defined application installed in the image forming apparatus 100 from the application management server 200 in response to transmission of the information to the application management server 200 that that the toner cartridge is non-genuine in operation S725.

The image forming apparatus 100 may change configuration information stored in the image forming apparatus 100 based on the license information including the restrictions received from the application management server 200 in operation S730.

The image forming apparatus 100 may execute the user defined application by restricting functions of the user defined application according to the changed configuration information in operation S735.

FIG. 8 illustrates an example in which, when a non-genuine toner cartridge is mounted in an image forming apparatus, an image management apparatus receives, from an application management server, configuration information including restrictions in order to restrict functions of a user defined application installed in the image forming apparatus. Detailed descriptions that are the same as those provided in FIG. 7 will be omitted.

Referring to FIG. 8, the image forming apparatus 100 may be connected to the application management server 200 in operation S805.

The image forming apparatus 100 may determine whether a toner cartridge mounted in the image forming apparatus 100 is genuine based on information of the toner cartridge mounted in the image forming apparatus 100 in operation S810.

When it is determined that the toner cartridge is non-genuine, the image forming apparatus 100 may transmit information, to the application management server 200, that the toner cartridge is non-genuine in operation S815.

The application management server 200 may add restrictions to the configuration information of a user defined application installed in the image forming apparatus 100 in which the non-genuine toner cartridge is mounted in operation S820.

The image forming apparatus 100 may receive the configuration information including the restrictions on the user defined application installed in the image forming apparatus 100 from the application management server 200 in response to transmission of the information to the application management server 200 that the toner cartridge is non-genuine in operation S825.

The image forming apparatus 100 may change the configuration information stored in the image forming apparatus 100 based on the configuration information including the restrictions received from the application management server 200 in operation S830.

The image forming apparatus 100 may execute the user defined application by restricting functions of the user defined application according to the changed configuration information in operation S835.

Figure 9:
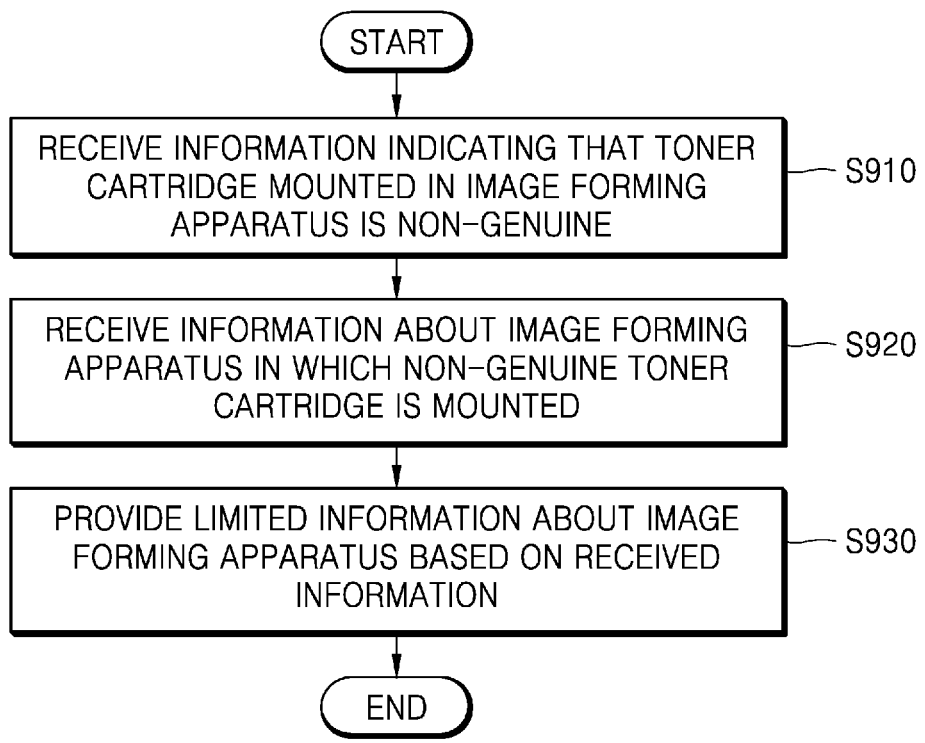
FIG. 9 is a flowchart illustrating a process in which, when a non-genuine toner cartridge is mounted in an image forming apparatus, an application management server provides limited information about the image forming apparatus in which the non-genuine toner cartridge is mounted according to an example.

FIG. 9 is a flowchart illustrating a process in which, when a non-genuine toner cartridge is mounted in an image forming apparatus, an application management server provides limited information about the image forming apparatus in which the non-genuine toner cartridge is mounted according to an example.

Referring to FIG. 9, the application management server 200 may receive information that a toner cartridge mounted in the image forming apparatus 100 is non-genuine from the image forming apparatus 100 in which the non-genuine toner cartridge is mounted in operation S910.

The application management server 200 may receive information, from the image forming apparatus 100, about the image forming apparatus 100 in which the non-genuine toner cartridge is mounted in operation S920.

The application management server 200 may provide limited information about the image forming apparatus 100 based on the information received from the image forming apparatus 100 in which the non-genuine toner cartridge is mounted in operation S930.

Figure 10:
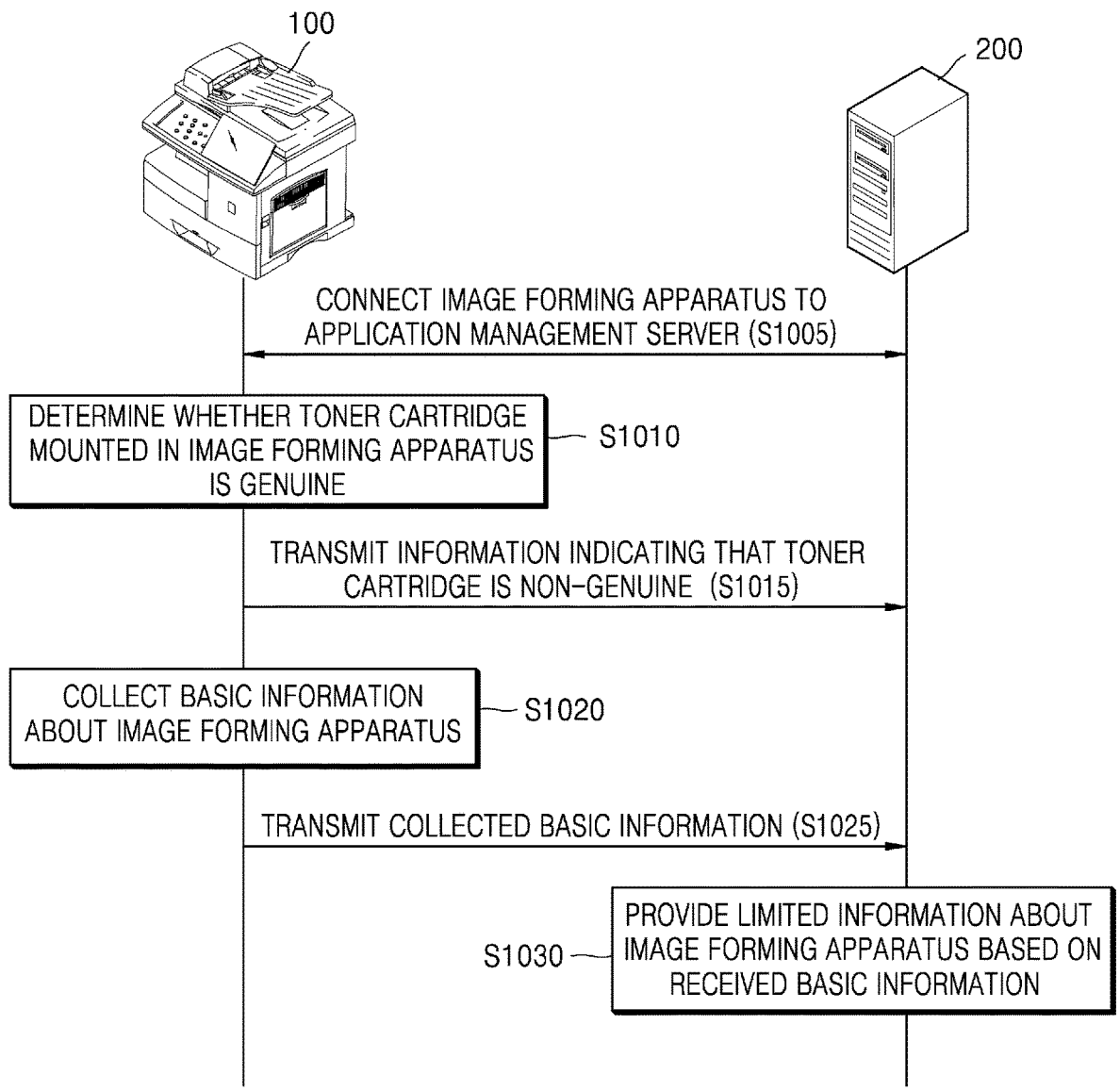
FIGS. 10 and 11 illustrate examples in which, when a non-genuine toner cartridge is mounted in an image forming apparatus, an application management server receives information about the image forming apparatus in which the non-genuine toner cartridge is mounted and provides only limited information.
Figure 11:
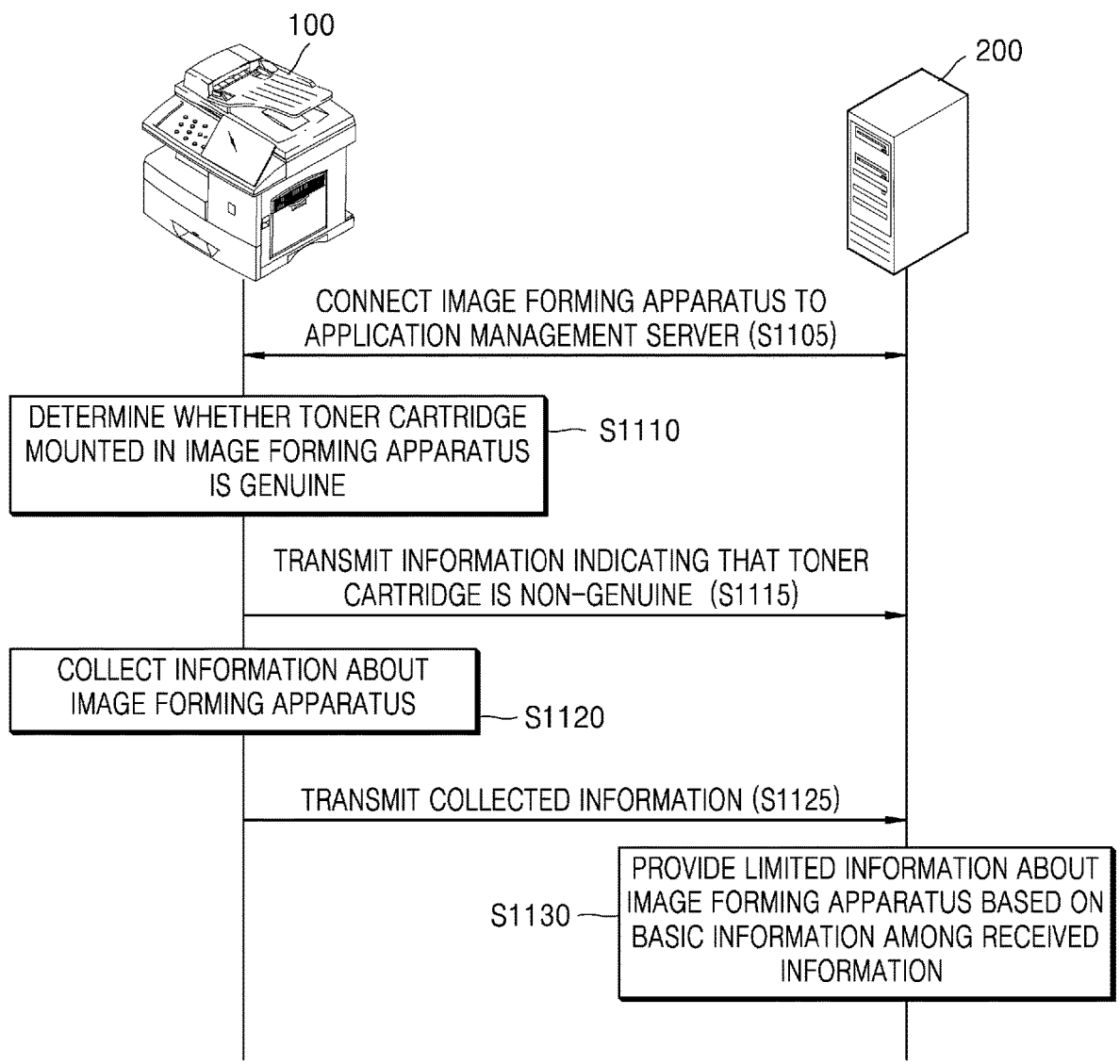

FIGS. 10 and 11 illustrate examples in which, when a non-genuine toner cartridge is mounted in an image forming apparatus, an application management server receives information about the image forming apparatus in which the non-genuine toner cartridge is mounted and provides only limited information.

FIG. 10 illustrates an example in which, when a non-genuine toner cartridge is mounted in an image forming apparatus, the image forming apparatus collects only basic information about the image forming apparatus and transmits the collected basic information to an application management server, and the application management server provides only the limited information.

Referring to FIG. 10, the image forming apparatus 100 may be connected to the application management server 200 in operation S1005. For example, the image forming apparatus 100 may be connected to the application management server 200 in a process of downloading and installing a user defined application provided by the application management server 200 or executing the user defined application installed in the image forming apparatus 100.

The image forming apparatus 100 may determine whether a toner cartridge mounted in the image forming apparatus 100 is genuine, based on information of the toner cartridge mounted in the image forming apparatus 100 in operation S1010. The information of the toner cartridge may be stored in the toner cartridge or in the image forming apparatus 100 in which the toner cartridge is mounted.

When it is determined that the toner cartridge is non-genuine, the image forming apparatus 100 may transmit information, to the application management server 200, that the toner cartridge is non-genuine in operation S1015. Identification information of the image forming apparatus 100 may be transmitted to the application management server 200 together with the information that the toner cartridge is non-genuine.

The image forming apparatus 100 may collect basic information about the image forming apparatus 100 in operation S1020. The basic information refers to minimum information used for identification of the image forming apparatus 100 or connection with the image forming apparatus 100, and state information or consumable information of the image forming apparatus 100 used for managing the image forming apparatus 100 refers to excluded information. The image forming apparatus 100 may select and collect only information corresponding to the basic information from the information about the image forming apparatus 100.

The image forming apparatus 100 may transmit the collected basic information to the application management server 200 in operation S1025.

The application management server 200 may provide the limited information about the image forming apparatus 100 based on the basic information received from the image forming apparatus 100 in which the non-genuine toner cartridge is mounted in operation S1030. Accordingly, it may be difficult for the application management server 200 to manage the image forming apparatus 100 in which the non-genuine toner cartridge is mounted.

FIG. 11 illustrates an example in which, when a non-genuine toner cartridge is mounted in an image forming apparatus, the image forming apparatus collects all information about the image forming apparatus and transmits the collected information to an application management server, and the application management server provides only limited information. Detailed descriptions that are the same as those provided in FIG. 10 will be omitted.

Referring to FIG. 11, the image forming apparatus 100 may be connected to the application management server 200 in operation S1105.

The image forming apparatus 100 may determine whether a toner cartridge mounted in the image forming apparatus 100 is genuine, based on information of the toner cartridge mounted in the image forming apparatus 100 in operation S1110.

When it is determined that the toner cartridge is non-genuine, the image forming apparatus 100 may transmit information, to the application management server 200, that the toner cartridge is non-genuine in operation S1115.

The image forming apparatus 100 may collect all the information about the image forming apparatus 100 in operation S1120. All the information about the image forming apparatus 100 refers to information including state information or consumable information of the image forming apparatus 100 used for management of the image forming apparatus 100 as well as information used for identification of the image forming apparatus 100 and connection with the image forming apparatus 100.

The image forming apparatus 100 may transmit the collected information to the application management server 200 in operation S1125.

The application management server 200 may provide limited information about the image forming apparatus 100 based on basic information among the information received from the image forming apparatus 100 in which the non-genuine toner cartridge is mounted in operation S1130. The application management server 200 may filter the information received from the image forming apparatus 100 in which the non-genuine toner cartridge is mounted and provide only the limited information corresponding to the basic information.

Figure 12:
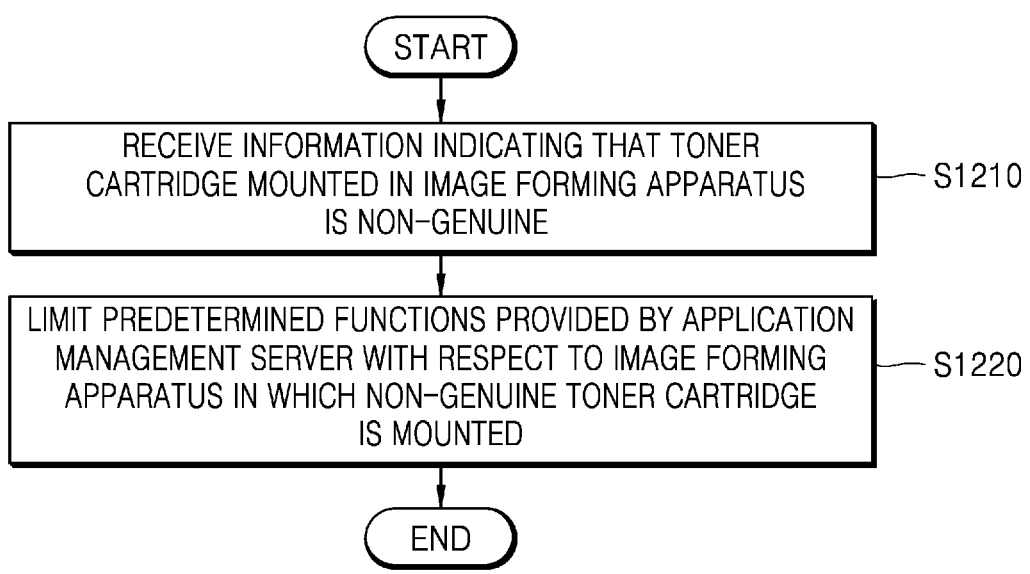
FIG. 12 is a flowchart illustrating a process in which, when a non-genuine toner cartridge is mounted in an image forming apparatus, an application management server limits a predetermined function provided by the application management server according to an example.

FIG. 12 is a flowchart illustrating a process in which, when a non-genuine toner cartridge is mounted in an image forming apparatus, an application management server limits a predetermined function provided by the application management server according to an example.

Referring to FIG. 12, the application management server 200 may receive information that a toner cartridge mounted in the image forming apparatus 100 is non-genuine from the image forming apparatus 100 in which the non-genuine toner cartridge is mounted in operation S1210.

The application management server 200 may limit a predetermined function provided by the application management server 200 with respect to the image forming apparatus 100 in which the non-genuine toner cartridge is mounted in operation S1220.

Figure 13:
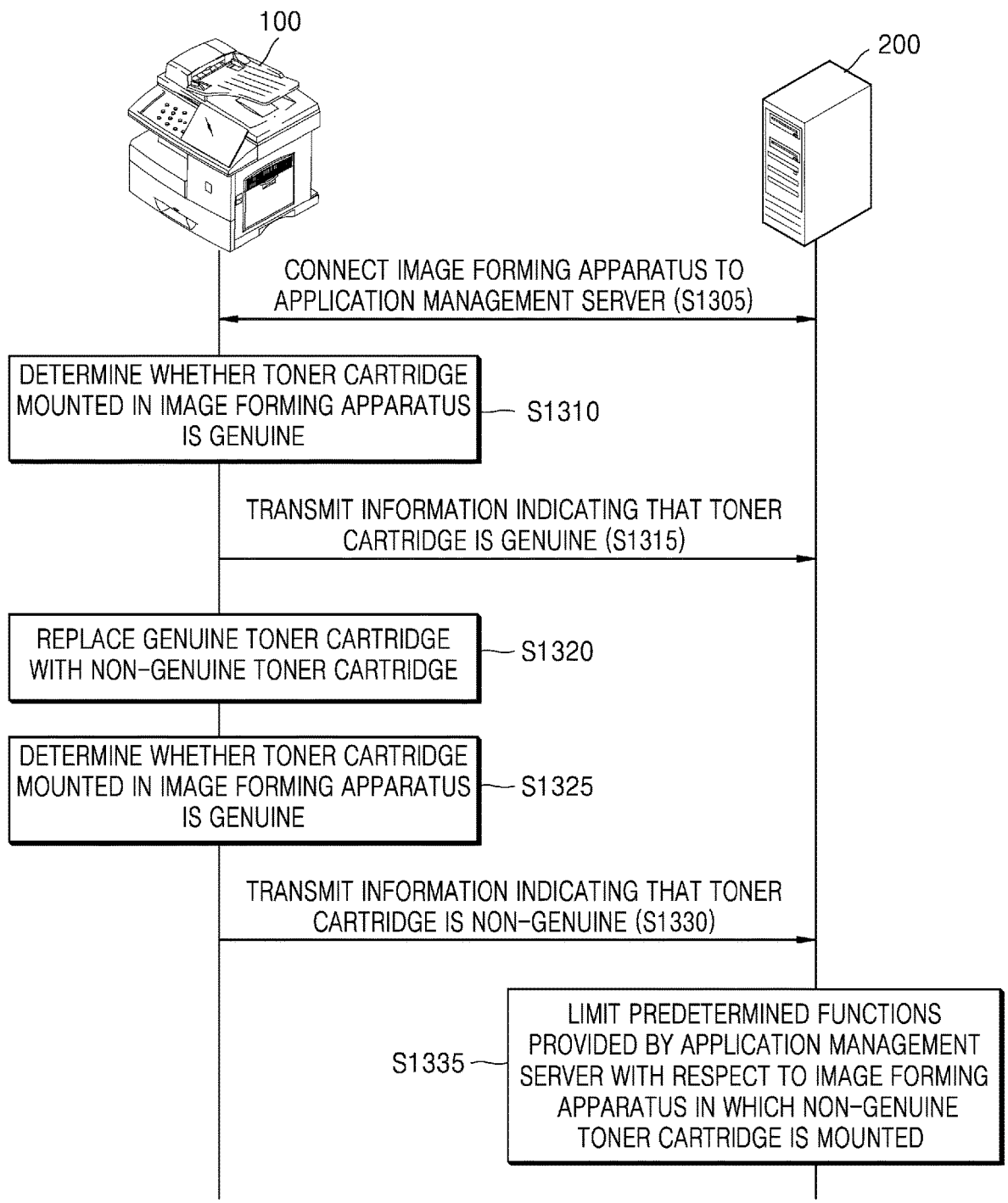
FIG. 13 illustrates an example in which, when a genuine toner cartridge is replaced with a non-genuine toner cartridge in an image forming apparatus, an application management server limits a predetermined function provided by the application management server.

FIG. 13 illustrates an example in which, when a genuine toner cartridge is replaced with a non-genuine toner cartridge in an image forming apparatus, an application management server limits a predetermined function provided by the application management server.

Referring to FIG. 13, the image forming apparatus 100 may be connected to the application management server 200 in operation S1305. For example, the image forming apparatus 100 may be connected to the application management server 200 in a process of downloading and installing a user defined application provided by the application management server 200 or executing the user defined application installed in the image forming apparatus 100.

The image forming apparatus 100 may determine whether a toner cartridge mounted in the image forming apparatus 100 is genuine, based on information of the toner cartridge mounted in the image forming apparatus 100 in operation S1310. The information of the toner cartridge may be stored in the toner cartridge or in the image forming apparatus 100 in which the toner cartridge is mounted.

When it is determined that the toner cartridge is genuine, the image forming apparatus 100 may transmit information, to the application management server 200, that the toner cartridge is genuine in operation S1315.

Thereafter, the image forming apparatus 100 may perform a job of replacing the genuine toner cartridge with a non-genuine toner cartridge in operation S1320. When the genuine toner cartridge is replaced with the non-genuine toner cartridge, unless the application management server 200 is aware of the replacement of the toner cartridge, the application management server 200 may determine that the genuine toner cartridge is still mounted in the image forming apparatus 100 according to the previously received information. Accordingly, there may be a problem that the application management server 200 provides the same service as before to the image forming apparatus 100 in which the non-genuine toner cartridge is mounted.

Therefore, upon replacement of the toner cartridge, the image forming apparatus 100 may determine whether the toner cartridge mounted in the image forming apparatus 100 is genuine based on information of the toner cartridge newly mounted in the image forming apparatus 100 in operation S1325.

When it is determined that the toner cartridge is non-genuine, the image forming apparatus 100 may transmit information, to the application management server 200, that the toner cartridge is non-genuine in operation S1330. Identification information of the image forming apparatus 100 may be transmitted to the application management server 200 together with the information that the toner cartridge is non-genuine.

The application management server 200 may limit a predetermined function provided by the application management server 200 with respect to the image forming apparatus 100 in which the non-genuine toner cartridge is mounted in operation S1335. In this case, the application management server 200 may limit the predetermined function provided by the application management server 200 based on history information of the image forming apparatus 100, for example, information such as the number of times of use of the non-genuine toner cartridge, the period of use, etc.

For example, the application management server 200 may not allow the image forming apparatus 100 in which the non-genuine toner cartridge is mounted to receive a predetermined service such as inquiry, download, installation, update, etc. of the user defined application by not selecting a function corresponding to the service or not selecting the image forming apparatus 100 in which the non-genuine toner cartridge is mounted as a subject receiving the service.

When the application management server 200 includes a first server (not shown) that serves as an interface for access from the outside and a second server (not shown) that registers and downloads the user defined application, the first server may provide the inquiry service of the user defined application according to state information of the user defined application registered in the second server, and the second server may provide a download or execution service according to the state information of the user defined application. The state information of the user defined application may include a 'Published' type in which both download and execution are possible, an 'Unpublished' type in which download and execution are possible but an outside inquiry is not possible, a 'Private' type in which download and execution are possible but an inquiry of only a designated reseller is possible, an 'Archived' type in which execution is possible but download is not possible, and a 'Revoked' type in which both download and execution are not possible.

Figure 14:
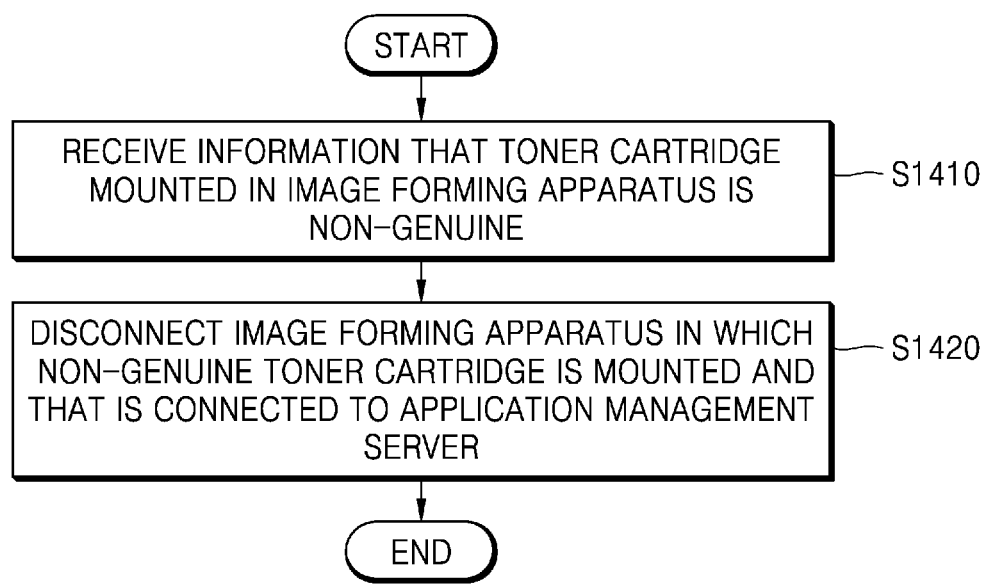
FIG. 14 is a flowchart illustrating a process in which, when a non-genuine toner cartridge is mounted in an image forming apparatus, an application management server disconnects the image forming apparatus connected to the application management server according to an example.

FIG. 14 is a flowchart illustrating a process in which, when a non-genuine toner cartridge is mounted in an image forming apparatus, an application management server disconnects the image forming apparatus connected to the application management server according to an example.

Referring to FIG. 14, the application management server 200 may receive information that a toner cartridge mounted in the image forming apparatus 100 is non-genuine from the image forming apparatus 100 in which the non-genuine toner cartridge is mounted in operation S1410.

The application management server 200 may disconnect the image forming apparatus 100 in which the non-genuine toner cartridge is mounted and that is connected to the application management server 200 in operation S1420.

Figure 15:
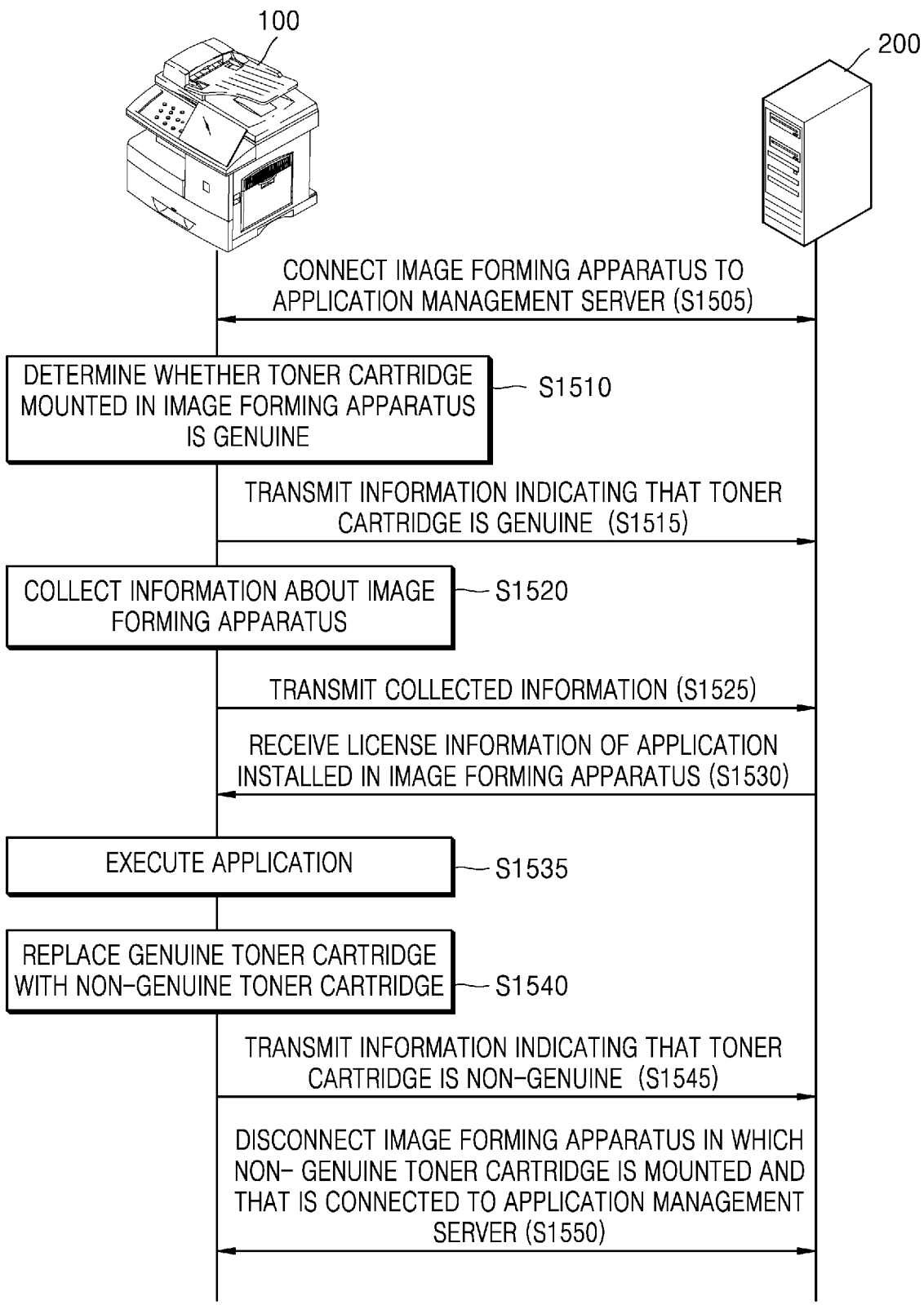
FIG. 15 illustrates an example in which, when a genuine toner cartridge is replaced with a non-genuine toner cartridge in an image forming apparatus, an application management server disconnects the image forming apparatus connected to the application management server.

FIG. 15 illustrates an example in which, when a genuine toner cartridge is replaced with a non-genuine toner cartridge in an image forming apparatus, an application management server disconnects the image forming apparatus connected to the application management server. Detailed descriptions that are the same as those provided in FIG. 13 will be omitted.

Referring to FIG. 15, the image forming apparatus 100 may be connected to the application management server 200 in operation S1505.

The image forming apparatus 100 may determine whether a toner cartridge mounted in the image forming apparatus 100 is genuine, based on information of the toner cartridge mounted in the image forming apparatus 100 in operation S1510.

When it is determined that the toner cartridge is genuine, the image forming apparatus 100 may transmit information, to the application management server 200, that the toner cartridge is genuine in operation S1515.

The image forming apparatus 100 may collect information about the image forming apparatus 100 in which the genuine toner cartridge is mounted in operation S1520.

The image forming apparatus 100 may transmit the collected information to the application management server 200 in operation S1525.

The image forming apparatus 100 may receive license information of an application installed in the image forming apparatus 100 from the application management server 200 in operation S1530.

The image forming apparatus 100 may execute the application installed in the image forming apparatus 100 based on the received license information in operation S1535.

Thereafter, the image forming apparatus 100 may perform a job of replacing the genuine toner cartridge with a non-genuine toner cartridge in operation S1540. When the toner cartridge is replaced, the image forming apparatus 100 may determine whether the toner cartridge mounted in the image forming apparatus 100 is genuine based on information of the toner cartridge newly mounted in the image forming apparatus 100.

When it is determined that the toner cartridge is non-genuine, the image forming apparatus 100 may transmit information, to the application management server 200, that the toner cartridge is non-genuine in operation S1545. Identification information of the image forming apparatus 100 may be transmitted to the application management server 200 together with the information that the toner cartridge is non-genuine.

The application management server 200 may disconnect the image forming apparatus 100 in which the non-genuine toner cartridge is mounted and that is connected to the application management server 200 in operation S1550. At this time, the application management server 200 may disconnect the image forming apparatus 100 in which the non-genuine toner cartridge is mounted and that is connected to the application management server 200 based on history information of the image forming apparatus 100. In an example, the history information may include information such as the number of times of use of the non-genuine toner cartridge, the period of use, etc.

FIG. 16 is a flowchart illustrating a process in which, when a non-genuine toner cartridge is mounted in an image forming apparatus, the image forming apparatus provides a pop-up window prompting use of a genuine toner cartridge when executing a user-defined application installed in the image forming apparatus according to an example.

Referring to FIG. 16, the image forming apparatus 100 may determine whether a toner cartridge mounted in the image forming apparatus 100 is genuine in operation S1610.

When it is determined that the toner cartridge is non-genuine, the image forming apparatus 100 may transmit information, to the application management server 200, that the toner cartridge is non-genuine in operation S1620.

The image forming apparatus 100 may transmit, to the application management server 200, information about the image forming apparatus 100 in which the non-genuine toner cartridge is mounted in operation S1630.

The image forming apparatus 100 may receive, from the application management server 200, license information including restrictions on an application installed in the image forming apparatus 100 in response to transmission of the information about the image forming apparatus 100 in operation S1640.

The image forming apparatus 100 may provide a pop-up window prompting the use of the genuine toner cartridge when executing a user defined application installed in the image forming apparatus 100 based on the received license information including the restrictions in operation S1650.

FIG. 17 illustrates an example in which, when a non-genuine toner cartridge is mounted in an image forming apparatus, the image forming apparatus provides a pop-up window prompting use of a genuine toner cartridge when executing a user defined application installed in the image forming apparatus based on license information including restrictions received from an application management server.

Referring to FIG. 17, the image forming apparatus 100 may be connected to the application management server 200 in operation S1705. For example, the image forming apparatus 100 may be connected to the application management server 200 in a process of downloading and installing a user defined application provided by the application management server 200 or executing the user defined application installed in the image forming apparatus 100.

The image forming apparatus 100 may determine whether a toner cartridge mounted in the image forming apparatus 100 is genuine based on information of the toner cartridge mounted in the image forming apparatus 100 in operation S1710. The information of the toner cartridge may be stored in the toner cartridge or in the image forming apparatus 100 in which the toner cartridge is mounted.

When it is determined that the toner cartridge is non-genuine, the image forming apparatus 100 may transmit information, to the application management server 200, that the toner cartridge is non-genuine in operation S1715. The identification information of the image forming apparatus 100 may be transmitted to the application management server 200 together with the information that the toner cartridge is non-genuine.

The image forming apparatus 100 may collect information about the image forming apparatus 100 in which the non-genuine toner cartridge is mounted in operation S1720.

The image forming apparatus 100 may transmit the collected information to the application management server 200 in operation S1725.

The image forming apparatus 100 may receive the license information including the restrictions on the user defined application installed in the image forming apparatus 100 from the application management server 200 in operation S1730.

The image forming apparatus 100 may provide the pop-up window prompting the use of the genuine toner cartridge when executing the user defined application installed in the image forming apparatus 100 based on the received license information including the restrictions in operation S1735. In an example, the pop-up window prompting the use of the genuine toner cartridge may display a web page for purchasing the genuine toner cartridge or an advertisement of the genuine toner cartridge.

Examples related to an application management method of the image forming apparatus 100 or an operation method of the application management server 200 described above may be provided in the form of an application or computer program stored in a computer-readable storage medium in order for the image forming apparatus 100 or the application management server 200 to perform each operation of the methods described above.

The application management method of the image forming apparatus 100 or the operation method of the application management server 200 described above may be in part or wholly implemented by a non-transitory computer-readable storage medium storing instructions or data executable by a computer or a processor. The examples may be written as computer programs and may be implemented in general-use digital computers that execute the programs by using a computer-readable storage medium. Examples of the computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disk, solid-status disk (SSD), and instructions or software, associated data, data files, and data structures, and any device capable of providing instructions or software, associated data, data files, and data structures to a processor or a computer such that the processor or computer may execute instructions.

What is claimed is:

1. An image forming apparatus comprising:
a memory storing computer executable instructions; and
a processor, by executing the computer executable instructions, to:
determine that a toner cartridge mounted in the image forming apparatus is non-genuine based on the image forming apparatus not being connected to an application management server for a predetermined period of time, and
based on determining that the toner cartridge is non-genuine, deactivate an application installed in the image forming apparatus.

2. The image forming apparatus of claim 1, wherein the application installed in the image forming apparatus comprises a user-defined application.

3. The image forming apparatus of claim 2, wherein the user-defined application is received from the application management server.

4. The image forming apparatus of claim 1, wherein the processor, by further executing the computer executable instructions, is to, based on determining that the toner cartridge is non-genuine, deactivate license information of the application.

5. The image forming apparatus of claim 4, wherein the processor, by further executing the computer executable instructions, is to deactivate an execution button of the application having the deactivated license information.

6. An image forming apparatus comprising:
a memory storing computer executable instructions;
a communication interface device; and
a processor, by executing the computer executable instructions, to:
determine whether a toner cartridge mounted in the image forming apparatus is genuine based on information of the toner cartridge mounted in the image forming apparatus,
based on determining that the toner cartridge is non-genuine, deactivate an application installed in the image forming apparatus, and
based on determining that the toner cartridge is non-genuine, receive deactivated license information of the application from an application management server through the communication interface device in response to transmission of information indicating that the toner cartridge is non-genuine to the application management server.

7. The image forming apparatus of claim 6, wherein the processor, by further executing the computer executable instructions, is to:
based on determining that the toner cartridge is non-genuine, deactivate license information of the application.

8. The image forming apparatus of claim 7, wherein the processor, by further executing the computer executable instructions, is to:
deactivate an execution button of the application having the deactivated license information.

9. An image forming apparatus comprising:
a communication interface device;
a memory storing computer executable instructions; and
a processor, by executing the computer executable instructions, to:
determine whether a toner cartridge mounted in the image forming apparatus is genuine,
when it is determined that the toner cartridge is non-genuine, transmit information indicating that the toner cartridge is non-genuine to an application management server through the communication interface device,
in response to the transmission, receive information comprising restrictions on an application installed in the image forming apparatus,
change configuration information stored in the image forming apparatus based on the received information comprising the restrictions,
restrict functions of the application according to the changed configuration information, and
execute the application.

10. The image forming apparatus of claim 9, wherein the processor, by further executing the computer executable instructions, is to receive, through the communication interface device, in response to the transmission, license information comprising the restrictions or the configuration information comprising the restrictions on the application installed in the image forming apparatus.

11. An application management server comprising:
a communication interface device;
a memory storing computer executable instructions; and
a processor, by executing the computer executable instructions, to:
through the communication interface device, receive information indicating that a toner cartridge mounted in an image forming apparatus is non-genuine, and
with respect to the image forming apparatus in which the non-genuine toner cartridge is mounted, limit predetermined functions provided by the application management server.

12. The application management server of claim 11, wherein the processor, by further executing the computer executable instructions, is to, based on history information of the image forming apparatus in which the non-genuine toner cartridge is mounted, limit the predetermined functions provided by the application management server.

13. An application management server comprising:
a communication interface device;
a memory storing computer executable instructions; and
a processor, by executing the computer executable instructions, to:
through the communication interface device, receive information indicating that a toner cartridge mounted in an image forming apparatus is non-genuine, and
disconnect the image forming apparatus in which the non-genuine toner cartridge is mounted from the application management server.

14. The application management server of claim 13, wherein the processor, by further executing the computer executable instructions, is to, based on history information of the image forming apparatus in which the non-genuine toner cartridge is mounted, disconnect the image forming apparatus in which the non-genuine toner cartridge is mounted from the application management server.

15. An image forming apparatus comprising:
a communication interface device;
a user interface device;
a memory storing computer executable instructions; and
a processor, by executing the computer executable instructions, to:
determine whether a toner cartridge mounted in the image forming apparatus is genuine,
when it is determined that the toner cartridge is non-genuine, transmit information indicating that the toner cartridge is non-genuine to an application management server, through the communication interface device,
transmit information about the image forming apparatus in which the non-genuine toner cartridge is mounted to the application management server,
in response to the transmission of the information about the image forming apparatus, receive license information comprising restrictions on an application installed in the image forming apparatus from the application management server, and
when executing the application installed in the image forming apparatus, based on the received license information comprising the restrictions, provide a pop-up window prompting use of a genuine toner cartridge through the user interface device.

16. The image forming apparatus of claim 15, wherein the pop-up window prompting the use of the genuine toner cartridge displays a web page for purchasing the genuine toner cartridge or an advertisement for the genuine toner cartridge.

17. The image forming apparatus of claim 15, wherein the application installed in the image forming apparatus comprises a user-defined application.

18. The image forming apparatus of claim 17, wherein the processor, by further executing the computer executable instructions, is to receive the user-defined application from the application management server.

* * * * *